March 10, 1931.                H. A. PALLADY                1,796,159
                                  COUPLING
                              Filed Dec. 9, 1929
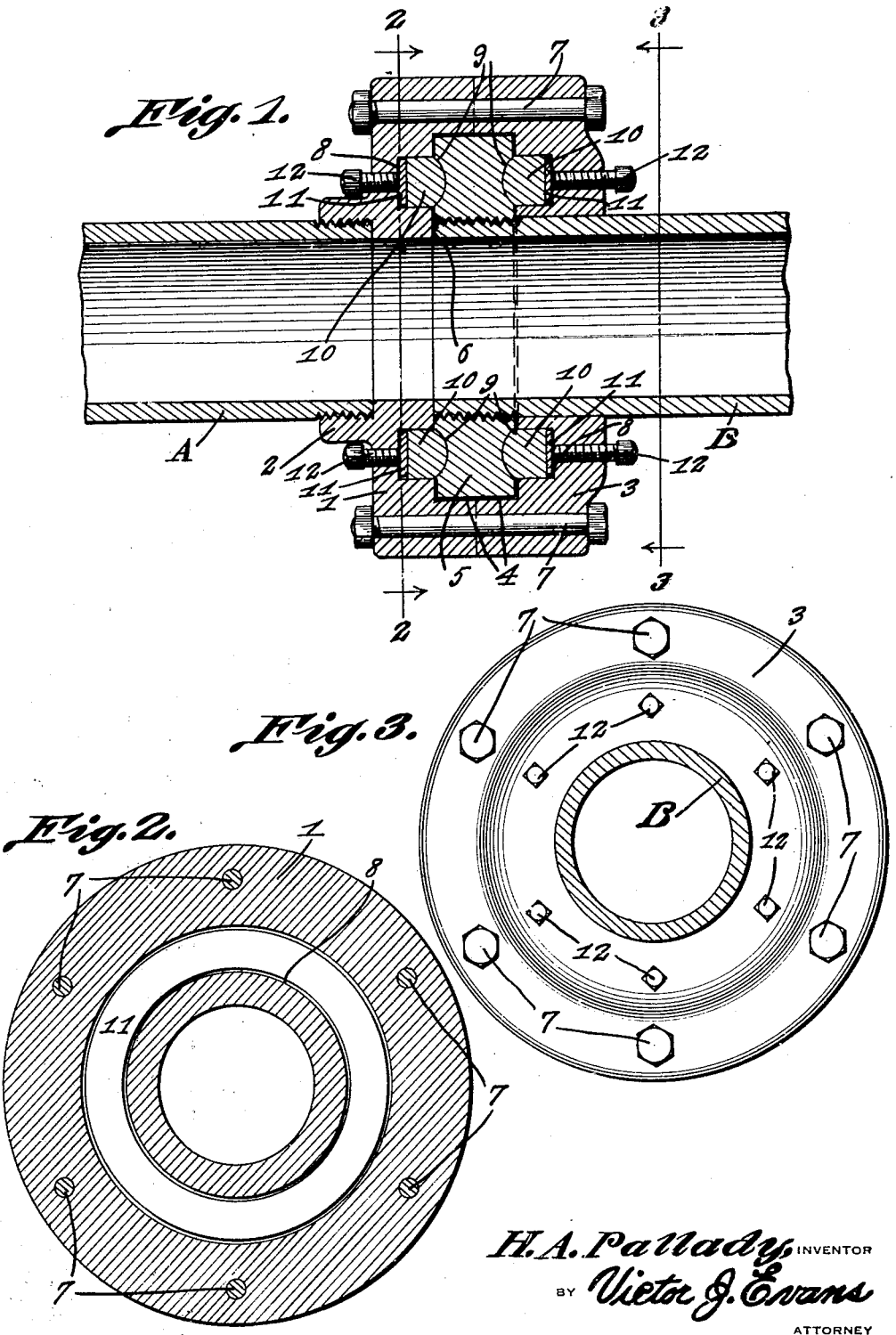
H. A. Pallady, INVENTOR
BY Victor J. Evans
ATTORNEY Patented Mar. 10, 1931

1,796,159

UNITED STATES PATENT OFFICE

HARRY A. PALLADY, OF PORTLAND, OREGON

COUPLING

Application filed December 9, 1929. Serial No. 412,877.

This invention relates to a pipe coupling, the general object of the invention being to provide means for connecting a pair of pipes together in such a manner that one pipe can have rotary motion in relation to the other and without causing leaks at the joint, the invention being mainly designed for use with suction lines, float lines, dredge pipes, mud pumps, etc.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a sectional view through the invention.

Figure 2 is a section on line 2—2 of Figure 1.

Figure 3 is a section on line 3—3 of Figure 1.

In these views, the numeral 1 indicates the casting which is provided with an internally threaded flange 2 to receive the pipe A, and 3 indicates another casting which is provided with a plain hole to rotatably receive the pipe B. Each casting is formed with an annular internal recess 4 which, when the two castings are placed together, forms an annular space to receive a disk or collar 5, preferably of bronze and which is internally threaded to engage the threaded end of the pipe B. After the collar is placed on the pipe, the parts are welded, as at 6, to prevent them becoming separated. The two castings are connected together by the bolts 7.

An annular groove 8 is formed in each casting and opens out into the space which receives the collar 5 and each face of the collar is formed with an annular groove 9 of substantially semi-circular form, each groove 9 being opposite the groove 8. A ring 10 of rubber or the like fits in the groove 8 and is adapted to have a portion pressed into the groove 9 by the metal ring 11 in the groove 8 and the set screws 12 passing through holes in the casting and engaging the metal ring.

From the foregoing it will be seen that by placing pressure upon the resilient rings through means of the set screws and the metal rings, a fluid-tight joint is formed between the parts so that no fluid can escape from the pipes at the coupling. These resilient rings also act as frictional means for preventing undue movement of the collar in the coupling.

Thus I have provided simple means for rotatably connecting one pipe with another and at the same time preventing leaks at the joint.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

Means for rotatably connecting a pair of pipes together, comprising a casting connected with one pipe, a second casting rotatably arranged on the second pipe, said casting forming an internal recess, a collar connected with the pipe on which the casting is rotatably mounted and arranged in the recess, each casting having an annular groove in its inner face opening out into the recess and each face of the collar having an annular groove registering with one of the before mentioned grooves, a resilient ring in each groove of each casting and means for applying pressure to the resilient rings to force portions thereof into the grooves in the collar to provide a fluid-tight joint.

In testimony whereof I affix my signature.

HARRY A. PALLADY.